US011652270B2

(12) United States Patent
Hon

(10) Patent No.: US 11,652,270 B2
(45) Date of Patent: May 16, 2023

(54) POINT TO POINT RADIO ALIGNMENT SYSTEM

(71) Applicant: Xiber, LLC, Indianapolis, IN (US)

(72) Inventor: Stephen Hon, Indianapolis, IN (US)

(73) Assignee: Xiber, LLC, Indianapolis, IN (US)

( * ) Notice: Subject to any disclaimer, the term of this patent is extended or adjusted under 35 U.S.C. 154(b) by 233 days.

(21) Appl. No.: 17/209,711

(22) Filed: Mar. 23, 2021

(65) Prior Publication Data

US 2021/0296756 A1 Sep. 23, 2021

Related U.S. Application Data

(60) Provisional application No. 62/993,367, filed on Mar. 23, 2020.

(51) Int. Cl.
*H04B 17/318* (2015.01)
*H01Q 1/12* (2006.01)

(52) U.S. Cl.
CPC ......... *H01Q 1/1257* (2013.01); *H04B 17/318* (2015.01)

(58) Field of Classification Search
CPC ............................ H04B 17/318; H01Q 1/1257
See application file for complete search history.

(56) References Cited

U.S. PATENT DOCUMENTS

2017/0311307 A1* 10/2017 Negus ................. H04W 72/046
2018/0198188 A1* 7/2018 Bensen .................... H01Q 3/08

* cited by examiner

*Primary Examiner* — Ankur Jain
*Assistant Examiner* — Angelica Perez
(74) *Attorney, Agent, or Firm* — Taft Stettinius & Hollister LLP

(57) ABSTRACT

A point to point radio alignment system is disclosed. A voltmeter positioned at the first antenna measures alignment voltage that is generated from an alignment of the first radio component positioned on the first antenna. A transceiver positioned at the first antenna receives a second alignment voltage that is measured at the second antenna and generated from an alignment of the second radio component positioned on the second antenna. A controller positioned at the first antenna simultaneously monitors the first alignment voltage as the alignment of the first radio component is adjusted and the second alignment voltage as the second radio component is adjusted. The controller simultaneously displays the first alignment voltage as the first radio component is adjusted and the second alignment voltage as the second radio component is adjusted to enable a first user to track an alignment of the first radio component and the second radio component.

20 Claims, 4 Drawing Sheets

POINT TO POINT RADIO ALIGNMENT SYSTEM

CROSS-REFERENCE TO RELATED APPLICATIONS

The present application is a U.S. Nonprovisional Application which claims the benefit of U.S. Provisional Application No. 62/993,367 filed on Mar. 23, 2020 which is incorporated herein by reference in its entirety.

BACKGROUND

Field of Disclosure

The present disclosure generally relates to radio communications and specifically to the point to point radio alignment of radio components positioned on antennas.

Related Art

Radio antennas that include radio components positioned on an antenna tower require point to point alignment with other radio antennas that also include radio components also positioned on antenna towers. The point to point alignment is necessary in order for the wireless transmission signal to travel from each radio antenna tower positioned in the wireless network. For example, a first radio component positioned on a first antenna tower is required to be aligned with a second radio component positioned on a second antenna tower in order for the first radio component positioned on the first antenna tower to transmit the wireless signal to the second radio component positioned on the second antenna tower. The misalignment of the radio components positioned on the different antenna towers may have a significant impact in the degradation of the wireless signal transmitted between the radio components.

Typically, the point to point alignment of the radio components requires a significant amount of time and resources to properly align. The radio components are significantly elevated from the ground requiring the technicians to take significant time as well as an increased risk in bodily harm in climbing to the radio components. Further, the conventional alignment process may take several hours to several days to property align thereby requiring the technicians to spend significant amount of time at the elevated heights and to repeatedly climb to the radio components before alignment is completed.

Conventional point to point alignment approaches require several technicians to operate in tandem simultaneously in order to align the radio components positioned on two different antenna towers. A first technician positioned at the elevated location of the radio component may adjust the radio component and a second technician also positioned at radio component may then identify the voltage resulting from that adjustment. The second technician may then radio to the technicians positioned at second antenna tower the voltage resulting from that adjustment. The technicians at the second antenna tower may then execute the same iterative step and radio the technicians at the first antenna tower the voltage resulting from their adjustment of the radio component. Such an iterative process may then continue for several hours to several days until the voltages resulting from the alignments of the radio components of the two antenna towers are aligned resulting in a significant increase in cost and time to properly execute the conventional point to point alignment of radio components.

BRIEF DESCRIPTION OF THE DRAWINGS/FIGURES

Embodiments of the present disclosure are described with reference to the accompanying drawings. In the drawings, like reference numerals indicate identical or functionally similar elements. Additionally, the left most digit(s) of a reference number typically identifies the drawing in which the reference number first appears.

DETAILED DESCRIPTION OF THE PRESENT DISCLOSURE

Figure 1:
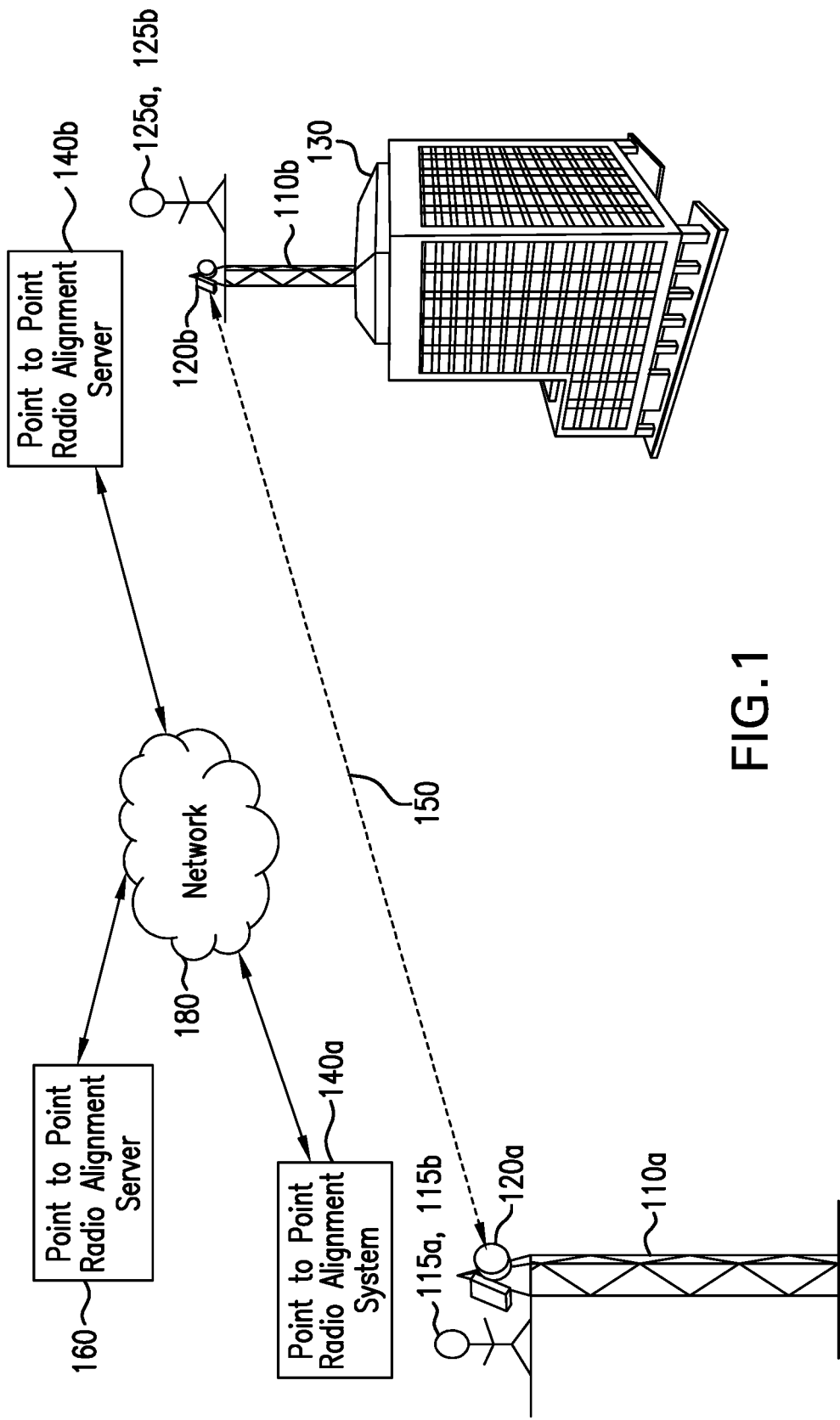
FIG. 1 illustrates a top-elevational view of a point to point alignment configuration such that two different radio components positioned on two different antennas are aligned such that wireless communication between the two different radio components may be executed.

The following Detailed Description refers to accompanying drawings to illustrate exemplary embodiments consistent with the present disclosure. References in the Detailed Description to "one exemplary embodiment," an "exemplary embodiment," an "example exemplary embodiment," etc., indicate the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic may be described in connection with an exemplary embodiment, it is within the knowledge of those skilled in the art(s) to effect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the present disclosure. Therefore, the Detailed Description is not meant to limit the present disclosure. Rather, the scope of the present disclosure is defined only in accordance with the following claims and their equivalents.

Embodiments of the present disclosure may be implemented in hardware, firmware, software, or any combination thereof. Embodiments of the present disclosure may also be implemented as instructions applied by a machine-readable medium, which may be read and executed by one or more processors. A machine-readable medium may include any mechanism for storing or transmitting information in a form readable by a machine (e.g., a computing device). For example, a machine-readable medium may include read only memory ("ROM"), random access memory ("RAM"), magnetic disk storage media, optical storage media, flash memory devices, electrical optical, acoustical or other forms of propagated signals (e.g., carrier waves, infrared signals, digital signals, etc.), and others. Further firmware, software routines, and instructions may be described herein as performing certain actions. However, it should be appreciated that such descriptions are merely for convenience and that such actions in fact result from computing devices, processors, controllers, or other devices executing the firmware, software, routines, instructions, etc.

For purposes of this discussion, each of the various components discussed may be considered a module, and the term "module" shall be understood to include at least one software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently from any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the present disclosure that others can, by applying knowledge of those skilled in the relevant art(s), readily modify and/or adapt for various applications such exemplary embodiments, without undue experimentation, without departing from the spirit and scope of the present disclosure. Therefore, such adaptations and modifications are intended to be within the meaning and plurality of equivalents of the exemplary embodiments based upon the teaching and guidance presented herein. It is to be understood that the phraseology or terminology herein for the purpose of description and not of limitation, such that the terminology or phraseology of the present specification is to be interpreted by those skilled in the relevant art(s) in light of the teachings herein.

System Overview

FIG. 1 illustrates a top-elevational view of a point to point alignment configuration such that two different radio components positioned on two different antennas are aligned such that wireless communication between the two different radio components may be executed. A point to point alignment configuration 100 includes a first antenna 110a. A first radio component 120a is positioned on the first antenna 110a and a first user 115a is positioned by the first radio component 120a in order to adjust the first radio component 120a. A second antenna 110b is positioned on the roof of a building 130. A second radio component 120b is positioned on the second antenna 110b and a second user 125a is positioned by the second radio component 120b in order to adjust the second radio component 120b. The first radio component 120a is positioned on a single first antenna 110a that has a significant height and the second radio component 120b is positioned on a single second antenna 110b positioned on the roof of the building 120. However, the first radio component 120a and the second radio component 120b may be positioned on any type of antenna configuration and/or building to execute the point to point alignment of the first radio component 120a and the second component 120b that will be apparent to those skilled in the relevant art(s) without departing from the spirit and scope of the disclosure.

The first radio component 120a may be aligned in a point to point alignment configuration with the second radio component 120b in order for the first radio component 120a and the second radio component 120b to engage in wireless communication. The first radio component 120a is to be aligned with the second radio component 120b such that the alignment between the first radio component 120a and the second radio component 120b is within an alignment threshold of each other. The alignment threshold is the threshold that the point to point alignment of the first radio component 120a and the second radio component 120b is to satisfy in order for the first radio component 120a and the second radio component 120b to engage in wireless communication in order to adequately support the wireless network that the first radio component 120a and the second radio component 120b are included.

For example, the target alignment voltage that the first radio component 120a is to be in point to point alignment with the second radio component 120b is 4.5V. In such an example, the alignment threshold for the first radio component 120a to engage in wireless communication with the second radio component 120b is +−0.1V from the target alignment voltage of 4.5V. The voltage output of the first radio component 120a is at 4.495V and the voltage output of the second radio component 120b is at 4.505V. Since the voltage output of the first radio component 120a is at 4.495V and the voltage output of the second radio component 120b is at 4.505V, the alignment threshold of +−0.1V from the target alignment voltage of 4.5V is satisfied thereby enabling the first radio component 120a and the second radio component 120b to engage in wireless communication.

However to further the example, the voltage output of the first radio component 120a is at 4.42V and the voltage output of the second radio component 120b is at 4.58V. Since the voltage output of the first radio component 120a is at 4.42V and the voltage output of the second radio component is at 4.58V, the alignment threshold of +−0.1V from the target alignment voltage 4.5V is not satisfied thereby failing to enable the first radio component 120a and the second radio component 120b to engage in wireless communication that is adequate to support the wireless network that the first radio component 120a and the second radio component 120b are included. In such an example, the first user 115a would have to continue to adjust the first radio component 120a and the second user 125a would have to continue to adjust the second radio component 120b in order to have the voltage output of the first radio component 120a and to have the voltage output of the second radio component 120b to be within the alignment threshold of 4.5V.

The radio frequency (RF) engineers that have designed the wireless network supported by the point to point alignment configuration 100 may determine the target alignment voltage and the alignment threshold that the first radio component 120a is to be aligned with the second radio component 120b. In determining the target alignment voltage and the alignment threshold, the RF engineers may determine that based on the distance the first radio component 120a and the second radio component 120b, the amount of bandwidth, the frequency spectrum of the bandwidth, the type of radio components, the type of antennas, the height of the radio components and so on the appropriate target alignment voltage and the alignment threshold. The appropriate target alignment voltage and the alignment threshold that the target alignment voltage of the first radio component 120a and the second radio component 120b are to be aligned is determined by the RF engineers based on the numerous alignment parameters incorporated by the RF engineers into the design of the wireless network supported by the first radio component 120a and the second radio component 120b. In doing so, the RF engineers may determine the appropriate target alignment voltage and the alignment threshold that the first radio component 120a and the second radio component 120b are to be aligned for the first radio component 120a and the second radio component 120b to engage in wireless communication that is adequate to support the wireless network that the first radio component and 120a and the second radio component 120b are included.

After the RF engineers have determined the appropriate target alignment voltage and the appropriate alignment threshold that the first radio component 120a is to be aligned with the second radio component 120b, the first radio component 120a may be installed on the first antenna 110a at the first location and the first radio component 120b may be installed on the second antenna 120b at the second location. Following the installation of the first radio component 120a on the first antenna 110a and the second radio component 120b on the second antenna 110b, the first user 115a may climb the first antenna 110a to take position at the first radio component 120a and the second user 125a may climb the second antenna 110b to take position at the second radio component 120b. The first user 115a and the second user 125a may be installers that have an expertise in aligning radio components to be within the alignment threshold of the target alignment voltage such that the corresponding radio components engage in wireless communication to support the wireless network that the radio components are included.

For example, the first radio component 120a may be positioned on the first antenna 110a at the first location and the second radio component 120b may be positioned on the second antenna 110b positioned on the roof of the building 130. The distance between the first radio component 120a and the second radio component 120b may be ten miles and the first radio component 120a and the second radio component are to be aligned in a one degree of bandwidth. In doing so, the RF engineers previously determined that the target alignment voltage to align the first radio component 120a with the second radio component 120b is 4.5V and the alignment threshold is +−0.1V to align the first radio component 120a with the second radio component 120b such that the first radio component 120a and the second radio component 120b engage in wireless communication to support the wireless network that the first radio component 120a and the second radio component 120b are included based on the numerous different alignment parameters.

The first user 115a may then install a voltmeter into a signal port of the first radio component 120a. The signal port of the first radio component 120a may provide a transmission signal 150 that is generated based on the wireless communication between the first radio component 120a and the second radio component 120b. The transmission signal 150 may be a Received Signal Strength Indicator (RSSI) that is a measurement of the power present in the transmission signal 150 as received by the first radio component 120a from the second radio component 120b. Different radio parameters may be associated with the first radio component 120a and the second radio component 120b that may include a conversion of the RSSI associated with the transmission signal 150 to a voltage value as provided by the manufacturer of the first radio component 120a and the second radio component 120b. Thus, the voltmeter installed into the signal port of the first radio component 120a may provide a voltage value that corresponds to the signal strength of the transmission signal 150 received from the second radio component 120b.

The first user 115a may then determine the first alignment voltage of the transmission signal 150 provided by the voltmeter installed in the signal port of the first radio component 120a. The first alignment voltage provided by the voltmeter corresponds to the current alignment of the first radio component 120a with the second radio component 120b based on the current signal strength of the transmission signal 150 received from the second radio component 120b. For example, the initial first alignment voltage provided by the voltmeter is 1.1V and the 1.1V corresponds to the current signal strength of the transmission signal 150 received from the second radio component 120b based on the current alignment of the first radio component 120a and the second radio component 120b.

However, in such an example, the target alignment voltage for the alignment of the first radio component 120a and the second radio component 120b is 4.5V as determined by the RF engineers in order for the first radio component 120a and the second radio component 120b to be in adequate wireless communication to support the wireless network that the first radio component 120a and the second radio component 120b are included. Thus, the first user 115a is required to significantly adjust the alignment of the first radio component 120a in order to increase the signal strength of the transmission signal 150 from the current alignment voltage of 1.1V to the target alignment voltage of 4.5V in order for the first radio component 120a and the second radio component 120b to be properly aligned to engage in wireless communication to support the wireless network.

The second user 125a may then install a voltmeter into a signal port of the second radio component 120b. The signal port of the second radio component 120b may provide a transmission signal 150 that is generated based on the wireless communication between the first radio component 120a and the second radio component 120b. Thus, the voltmeter installed into the signal port of the second radio component 120b may provide a second alignment voltage that corresponds to the signal strength of the transmission signal 150 received from the first radio component 120b. The second user 125a may then determine the second alignment voltage of the transmission signal 150 provided by the voltmeter installed in the signal port of the second radio component 120b. The second alignment voltage provided by the voltmeter corresponds to the current alignment of the second radio component 120b with the first radio component 120a based on the current signal strength of the transmission signal 150 received from the first radio component 120a. For example, the initial first alignment voltage provided by the voltmeter is 0.5V and the 0.5V corresponds to the current signal strength of the transmission signal 150 received from the first radio component 120a based on the current alignment of the first radio component 120a and the second radio component 120b. Thus, the second user 125a is required to significantly adjust the alignment of the second radio component 120b in order to increase the signal strength of the transmission signal 150 from the current second alignment voltage of 0.5V to the target alignment voltage of 4.5V in order for the first radio component 120a and the second radio component 120b to be properly aligned to engage in wireless communication to support the wireless network.

In order for the first user 115a to align the first radio component 120a with the second radio component 120b to increase the current first alignment voltage of 1.1V to 5.0V for the transmission signal 150, the first user 115a may manually adjust the first radio component 120a such that the physical direction that the first radio component 120a is oriented changes. For example, the first user 115a may manually adjust a specific alignment bolt positioned on the first radio component 120a with a wrench in order to adjust the physical direction that the first radio component 120a is oriented to change with the goal to adjust that physical direction to be closer aligned with the second radio component 120b. The second user 125a may attempt to align the second radio component 120b in a similar manner.

Conventionally, the first user 115a may be simply using a conventional voltmeter that is installed into the signal port of the first radio component 120a. Typically, the first user 115a may be accompanied by a first user 115b that is also positioned at the first radio component 120a on the first antenna 110a that is typically significantly elevated from the ground. The first user 115a may examine the first alignment voltage provided by the conventional voltmeter as the first user 115b adjusts the alignment bolt associated with the first radio component 120a with the wrench in an attempt to align the first radio component 120a with the second radio component 120b. An additional two users may then be positioned on the ground at the base of the first antenna 110a for safety purposes requiring a total of four users to be positioned at the first antenna 110a in the conventional approach of adjusting the first radio component 120a to be aligned with the second radio component 120b.

Conventionally, the second user 125a may be simply using a conventional voltmeter that is installed into the signal port of the second radio component 120a. Typically, the second user 125a may be accompanied by a second user 125b that is also positioned at the second radio component 120b on the second antenna 110b as positioned on the roof of the building 130 that is typically significantly elevated from the ground. The second user 125a may examine the first alignment voltage provided by the conventional voltmeter as the second user 125b adjusts the alignment bolt associated with the second radio component 120b with the wrench in an attempt to align the second radio component 120b with the first radio component 120a. An additional two users may then be positioned on the ground at the base of the second antenna 110b for safety purposes requiring a total of four users to be positioned at the second antenna 110b in the conventional approach of adjusting the second radio component 120b to be aligned with the first radio component 120a.

Returning to the first user 115a and the first user 115b positioned at the first radio component 120a on the first antenna 110a in the conventional approach, the first user 115b may adjust the alignment of the first radio component 120b via a minor turn of the alignment bolt associated with the first radio component 120b in an attempt to further align the first radio component 120a with the second radio component 120b. In doing so, the first alignment voltage associated with the transmission signal 150 received from the second radio component 120b after the first user 115b adjusts the alignment bolt associated with the first radio component 120a with a minor turn via a wrench may then be instantaneously displayed by the conventional voltmeter. For example, the first user 115a may determine that the first alignment voltage displayed by the conventional voltmeter following the turn of the alignment bolt associated with the first radio component 120a changes from 1.1V to 1.6V. In doing so, the adjustment of the alignment bolt associated with the first radio component 120a by the first user 115b via the wrench may for the time being move the first radio component 120a into closer alignment with the second radio component 120b based on the second alignment voltage of the transmission signal 150 provided by the signal port of the first radio component 120a increasing from 1.1V to 1.6V and is thereby closer to the target alignment voltage of 4.5V.

Conventionally, the first user 115a may then radio to the second user 125a positioned at the second radio component 120b on the second antenna 110b on the roof of the building 130 that the current first alignment voltage displayed by the conventional voltmeter installed into the signal port of the first radio component 120a is 1.6V. The second user 125b may then vocalize to the second user 125a that the current target alignment voltage displayed by the conventional voltmeter installed into the signal port of the first radio component 120b is 1.6V and that the second alignment voltage currently displayed by the conventional voltmeter installed in the signal port of the second radio component 120b is 0.8V. The second user 125a may then adjust the alignment bolt associated with the second radio component 120b via a minor turn with a wrench in an attempt to further align the second radio component 120b with the first radio component 120a.

In doing so, the first alignment voltage associated with the transmission signal 150 received from the first radio component 120a after the second user 125b adjusts the alignment bolt associated with the second radio component 120b with a minor turn via the wrench may then be instantaneously displayed by the conventional voltmeter. For example, the second user 125a may determine that the second alignment voltage displayed by the conventional voltmeter following the turn of the alignment bolt associated with the second radio component 120a changes from 0.8V to −1.6V. In doing so, the adjustment of the alignment bolt associated with the second radio component 120b by the second user 125b via the wrench may for the time being moved the second radio component 120b into being further out of alignment with the first radio component 120a based on the second alignment voltage of the transmission signal 150 provided by the signal port of the second radio component 120b decreasing from 0.8V to −1.6V and is thereby further from the target alignment voltage of 4.5V.

The conventional iterative process discussed in the above example where the first user 115a, 115b adjusts the alignment bolt associated with the first radio component 120a and then observe the instantaneous display current first alignment voltage by the conventional voltmeter and then radios that current first alignment voltage to the second user 125a, 125b and the second user repeats the process and may continue for hours and even days. The conventional iterative process is to continue until the first alignment voltage displayed by the conventional voltmeter that is installed into the signal port of the first radio component 120a is within the alignment threshold of +−0.5V of the target alignment voltage of 4.5V and the second alignment voltage displayed by the conventional voltmeter that is installed into the signal port of the second radio component 120b is within the alignment threshold of +−0.5V of the target alignment voltage of 4.5V. In doing so, the alignment of the first radio component 120a and the second radio component 120b may be sufficient to establish wireless communication to adequately support the wireless network that the first radio component 120a and the second radio component 120b are included.

However, the conventional iterative process may continue for hours and even days due to the non-historical and instantaneous feedback provided by the conventional voltmeter. As the first user 115b adjusts the alignment bolt associated with the first radio component 120a with the wrench, the feedback provided to the first user 115b is limited to the instantaneous first alignment voltage displayed by the conventional voltmeter to the first user 115a in reaction to the adjustment of the alignment bolt associated with the first radio component 120a. The conventional voltmeter fails to provide any type of historical feedback to the first user 115b as to the previous first alignment voltages that resulted from previous adjustments of the alignment bolt associated with the first radio component 120a as adjusted with the wrench by the first user 115a. The first user 115b out of skill and experience must simply rely upon the type of adjustment that the first user 115a made to the alignment bolt associated with the first radio component 120a to determine the impact such an adjustment made on the first alignment voltage displayed by the conventional voltmeter without any historical knowledge of how previous adjustments impacted the first alignment voltage displayed by the conventional voltmeter.

In compounding the conventional iterative process, the second user 125b is also adjusting the alignment bolt associated with the second radio component 120b with the wrench in tandem with the first user 115b adjusting the first radio component 120a. As the second user 125b adjusts the alignment bolt associated with the second radio component 120b, such an adjustment may deviate significantly from the progress that the first user 115b accomplished with the adjustment of the first radio component 120b. As with the first user 115b, the conventional voltmeter not only fails to provide any type of historical feedback to the second user 125b as to the previous second alignment voltages that resulted from previous adjustments of the alignment bolt associated with the second radio component 120b but also fails to provide any type of real-time feedback as well as historical feedback as to the second alignment voltage associated with the first radio component 120a. The second user 115b out of skill and experience must not only simply rely on instantaneous second alignment voltage displayed by the conventional voltmeter installed into the signal port of the second radio component 120b but also must simply rely on the instantaneous value of the first radio component 120a as radioed by the first user 115a. Such lack of historical feedback and/or real-time feedback as to the second alignment voltages of the first radio component 120a relative to the adjustment of the second radio component 120b continues to compound the conventional iterative process of aligning the first radio component 120a with the second radio component 120b thereby significantly increasing the cost of the alignment.

Rather than being limited to an instantaneous and non-historical display of the current alignment voltage of the radio component as well as not having any type of feedback from the current alignment voltage of the corresponding radio component, point to point alignment system 140(a-b) may provide to the first user 115a and the second user 125a an instantaneous display of the current first alignment voltage of the first radio component 120a as well as a historical display of past first alignment voltages as well as the instantaneous display of the current second alignment voltage of the second radio component 120b as well as a historical display of past second alignment voltages of the second radio component 120b. Point to point alignment system 140(a-b) may provide the appropriate feedback to the first user 115a and the second user 125a such that the first user 115a may easily view the instantaneous display of the current first alignment voltage after adjusting the first radio component 120a as well as view the historical display of past first alignment voltages that were generated from past adjustments of the first radio component 120a. In doing so, the first user 115a may have significant feedback so to the type of adjustment as well as the progress the first user 115a is making in aligning the first radio component 120a with the second radio component 120b. The same type of feedback is also provided to the second user 125a when adjusting the second radio component 120b.

Further, the first user 115a and the second user 125a may have further feedback as to the instantaneous current alignment voltage of the corresponding first radio component 120a and the second radio component 120b as well as the historical feedback as to the past alignment voltages of the corresponding first radio component 120a and the second radio component 120b. In doing so, the first user 115a may not only adjust the first radio component 120a based on the instantaneous first current alignment voltage and the historical alignment voltages of the first radio component 120a but may also adjust the first radio component 120a based on the instantaneous second alignment voltage and historical second alignment voltages of the second radio component 120b.

The significant conventional iterative process discussed above may thereby be decreased significantly as well as decreasing the amount of first users 115a, 115b and second users 125a, 125b required to conduct the alignment of the first radio component 120a and the second radio component 120b from four users at each site to one user at each site for simultaneous adjustment of the first radio component 120a and the second radio component 120b. However, a single user may be required in order to simply adjust the first radio component 120a and then travel to the second radio component 120b and adjust the second radio component 120b. Regardless, the cost and the time required to align the first radio component 120a and the second radio component 120b to adequately establish wireless communication to support the wireless network that the first radio component 120a and the second radio component 120b support may be significantly decreased.

Peer to Peer Alignment

As noted above, the point to point alignment system 140(a-b) may align the first radio component 120a that is positioned on the first antenna 110a and the second radio component 120b that is positioned on the second antenna 110b to enable wireless communication between the first radio component 110a and the second radio component 110b. The first point to point alignment system 140a that is positioned locally at the first radio component 120a may determine as the first user 115a adjusts the first radio component 120a the first alignment voltage that is generated from the alignment of the first radio component 120b. The first alignment voltage is adjusted when the alignment of the first radio component 120a is adjusted. In doing so, the first alignment voltage is captured locally in real-time as the first user 115a adjusts the first radio component 120a. The corresponding current first alignment voltage that is generated from the adjustment of the first radio component 120a by the first user 115a is then transmitted to the point to point radio alignment server 160 in real-time via network 180 and is stored in the point to point radio alignment server 160.

The second point to point alignment system 140b that is positioned locally at the second radio component 120b may then receive the first current alignment voltage that is generated from the adjustment of the first radio component 120a by the first user 115a as transmitted from the point to point radio alignment server 160 via network 180 in real-time as the first alignment voltage is generated by the adjustment of the first radio component 120a by the first user 115a. The second user 125a may then receive the real-time feedback as to the first alignment voltage that is currently generated by the current positioning of the first radio component 120*a*. The second user 125*a* may then adjust the second radio component 120*b* based on the current first alignment voltage.

The second point to point alignment system 140*b* may then determine as the second user 125*a* adjusts the second radio component 120*b* the second alignment voltage that is generated from the alignment of the second radio component 120*b*. In doing so, the second alignment voltage is captured locally in real-time as the second user 125*a* adjusts the second radio component 120*b*. The corresponding current second alignment voltage that is generated from the adjustment of the second radio component 120*b* by the second user 125*a* is then transmitted to a point to point radio alignment server 160 in real-time via network 180 and is stored in the point to point radio alignment server 160. Real-time is the current alignment voltage that is generated from the current alignment of the corresponding radio component resulting from the corresponding user adjusts the corresponding radio component. A previous alignment voltage that is generated from the previous alignment of the corresponding radio component resulting from a previous adjustment of the corresponding radio component by the corresponding user is a previous alignment voltage and/or a historical alignment voltage. An alignment voltage transitions from being real-time and/or current to previous and/or historical following a subsequent adjustment by the corresponding user of the corresponding radio component that results in a subsequent change in the alignment voltage.

The point to point alignment server 160 may then store each first alignment voltage that is generated from each adjustment of the first radio component 120*a* by the first user 115*a* as captured and transmitted by the first point to point radio alignment system 140*a*. The point to point alignment server 160 may then store each second alignment voltage that is generated from each adjustment of the second radio component 120*b* by the second user 115*b* as captured and transmitted by the second point to point radio alignment system 140*b*. The point to point alignment server 160 may then provide via the network 180 each stored first alignment voltage to the second point to point radio alignment system 140*b* such that the second user 125*a* may be able to observe both the current first alignment voltage that is indicative of the current alignment of the first radio component 120*a* as well as the previous and/or historical first alignment voltages as generated from previous adjustments of the first radio component 120*a* by the first user 115*a*.

The point to point alignment server 160 may then provide via the network 180 each stored second alignment voltage to the first point to point radio alignment system 140*a* such that the first user 115*a* may be able to observe both the current second alignment voltage that is indicative of the current alignment of the second radio component 120*b* as well as the historical second alignment voltages as generated from previous adjustments of the second radio component 120*b* by the second user 125*a*. As noted above, the conventional approach of adjusting the first radio component 120*a* and the second radio component 120*b* such that each are adequately aligned with each other to establish wireless communication fails to have a standard and/or documented correlation between each adjustment of each corresponding alignment bolt for the first radio component 120*a* and the second radio component 120*b*. The conventional approach fails to have any standard and/or documented correlation between the rotations of the alignment bolt to a corresponding degree of change in the alignment of the first radio component 120*a* and the second radio component 120*b*. Each corresponding user 115*a* and 125*a* simply adjusts the alignment bolt and are limited to the instantaneous alignment voltage that is displayed by the conventional voltmeter and then radioed from the first user 115*a* to the second user 125*a* and/or vice versa.

Rather than relying on the conventional radioing of the instantaneous alignment voltage that is displayed by the conventional voltmeter, the transmission of the current alignment voltages in real-time for both the first radio component 120*a* and the second radio component 120*b* as well as the historical alignment voltages for both the first radio component 120*a* and the second radio component 120*b* provides a correlation of adjusting the alignment bolt for the first user 115*a* and the second user 125*a*. The point to point radio alignment server 160 is able to provide both the real-time current alignment voltages as well as the historical alignment voltages for both the first radio component 120*a* and the second radio component 120*b* such that the first user 115*a* and the second user 125*a* may correlate how past adjustments of the alignment bolt for the first radio component 120*a* and the second radio component 120*b* has impacted the resulting alignment voltages. The first user 115*a* and the second user 125*a* may then analyze how each adjustment of the alignment bolt impacted past alignment voltages and then may correlate how a current adjustment of the alignment bolt may impact the current alignment voltages of both the first radio component 120*a* and the second radio component 120*b* that are displayed to the first user 115*a* and the second user 125*a* in real-time. In doing so, the first user 115*a* and the second user 125*a* may cut down the iterative process of aligning the first radio component 120*a* and the second radio component 120*b* to adequately establish wireless communication to support wireless network that each are positioned significantly.

Examples of point to point alignment server 160 may include a mobile telephone, a smartphone, a workstation, a portable computing device, other computing devices such as a laptop, or a desktop computer, cluster of computers, set-top box, a product inventory checking system and/or any other suitable electronic device that will be apparent to those skilled in the relevant art(s) without departing from the spirit and scope of the invention.

In an embodiment, multiple modules may be implemented on the same point to point alignment server 160. Such a point to point alignment server 160 may include software, firmware, hardware or a combination thereof. Software may include one or more applications on an operating system. Hardware can include, but is not limited to, a processor, a memory, and/or graphical user interface display.

As shown, alignment voltages may be streamed between the first point to point radio alignment system 140*a*, the second point to point radio alignment system 140*b*, and the point to point alignment server 160 via network 180. Network 180 includes one or more networks, such as the Internet. In some embodiments of the present disclosure, network 180 may include one or more wide area networks (WAN) or local area networks (LAN). Network 180 may utilize one or more network technologies such as Ethernet, Fast Ethernet, Gigabit Ethernet, virtual private network (VPN), remote VPN access, a variant of IEEE 802.11 standard such as Wi-Fi, and the like. Communication over network 180 takes place using one or more network communication protocols including reliable streaming protocols such as websocket and/or transmission control protocol (TCP). Each of the first point to point radio alignment system 140*a* and the second radio point to point alignment system 140b may interface with the point to point alignment server 160 via network 180 through an application programming interface (API), web interface and/or any other type of interface that will be apparent from those skilled in the relevant art(s) without departing from the spirit and scope of the present disclosure. These examples are illustrative and not intended to limit the present disclosure.

Figure 2:
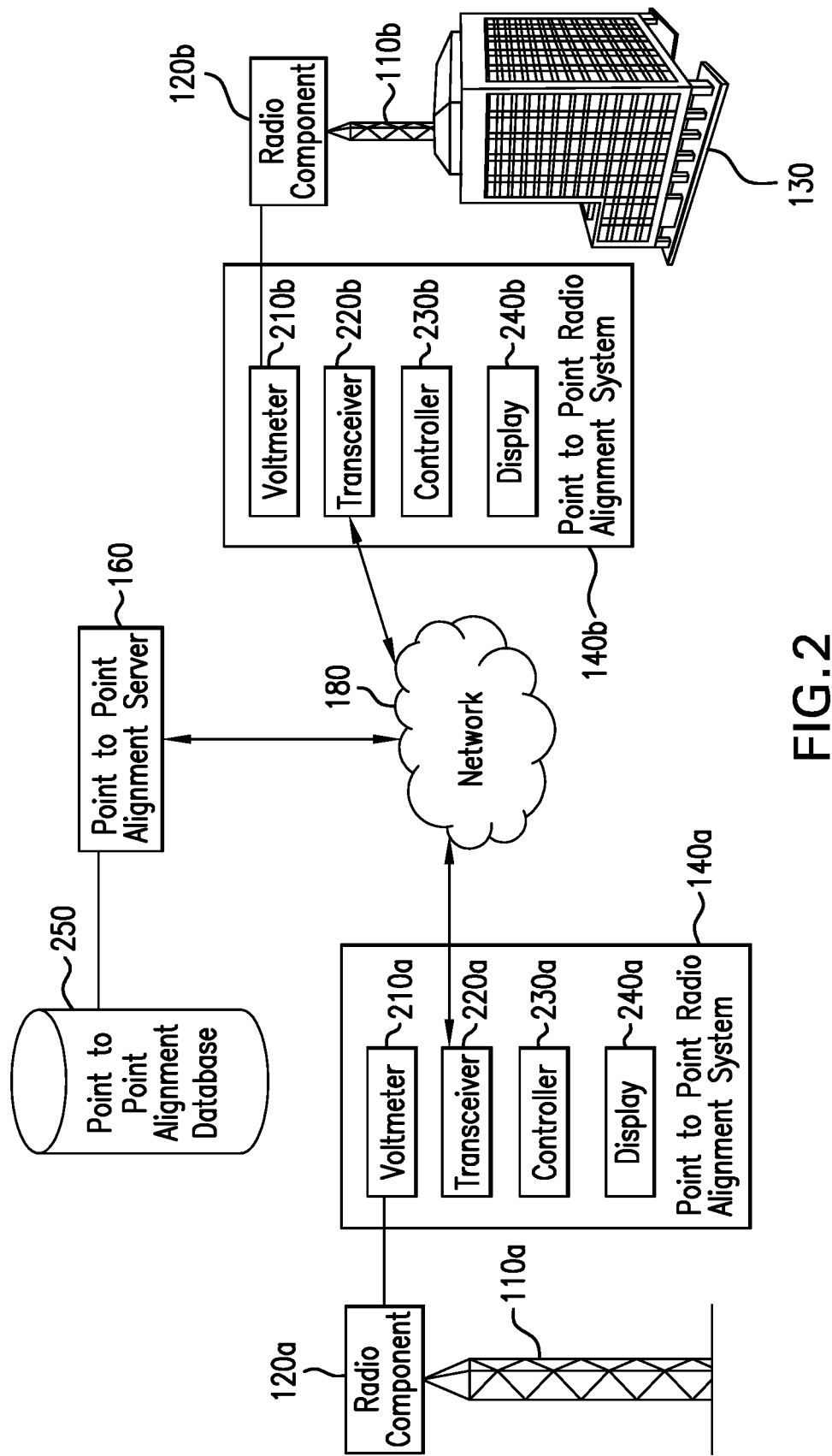
FIG. 2 illustrates a block diagram of a point to point alignment configuration that depicts the first point to point radio alignment system engaged with the first radio component positioned on the first antenna and the second point to point radio alignment system engaged with the second radio component positioned on the second antenna that is positioned on the roof of the building.

FIG. 2 illustrates a block diagram of a point to point alignment configuration 200 that depicts the first point to point radio alignment system 140a engaged with the first radio component 120a positioned on the first antenna 110a and the second point to point radio alignment system 140b engaged with the second radio component 120b positioned on the second antenna 110b that is positioned on the roof of the building 130. The first point to point radio alignment system 140a transmits the first alignment voltages to the point to point server 160 that stores the first alignment voltages in the point to point alignment database 250. The second point to point radio alignment system 140b transmits the second alignment voltages to the point to point server 160 that stores the second alignment voltages in the point to point alignment database 250. The point to point server 160 then provides the first alignment voltages to the second point to point radio alignment system 140b in real-time and the second alignment voltages to the first point to point radio alignment system 140a in real-time.

The first point to point radio alignment system 140a includes a voltmeter 210a, a transceiver 220a, a controller 230a and a display 240a. The second point to point radio alignment system 140b includes a voltmeter 210b, a transceiver 220b, an controller 230b, and a display 240b. The point to point radio alignment configuration 200 shares many similar features with the point to point radio alignment configuration 100; therefore only the differences between the point to point radio alignment configuration 200 and the point to point radio alignment configuration 100 are to be discussed in further details.

The first point to point radio alignment system 140a includes the voltmeter 210a that is positioned at the first antenna 110a and may measure the first alignment voltage that is generated from an alignment of the first radio component 120a positioned on the first antenna 110a. The first alignment voltage is adjusted when the alignment of the first radio component 120a is adjusted. The first point to point radio alignment system 140a may be installed into the port of the first radio component 120a such that the voltmeter 210a may measure the first alignment voltage in real-time as discussed above. The second point to point radio alignment system 140b includes the voltmeter 210b that is positioned at the second antenna 110b and may measure the second alignment voltage that is generated from an alignment of the second radio component 120a positioned on the second antenna 110b. The second alignment voltage is adjusted when the alignment of the second radio component 120b is adjusted. The second point to point radio alignment system 140b may be installed into the port of the second radio component 120b such that the voltmeter 210b may measure the second alignment voltage in real-time as discussed above.

The first point to point radio alignment system 140a includes the transceiver 220a that is positioned at the first antenna 110a and may receive the second alignment voltage that is measured at the second antenna 110b and generated from an alignment of the second radio component 120b positioned on the second antenna 110b. The second point to point radio alignment system 140b includes the transceiver 220b that is positioned at the second antenna 110b and may receive the first alignment that is measured at the first antenna 110b and generated from an alignment of the first radio component 120a positioned on the first antenna 110a.

The first point to point radio alignment system 140a includes the controller 230a that is positioned at the first antenna 110a. The controller 230a may simultaneously monitor the first alignment voltage as the alignment of the first radio component 120a is adjusted and the second alignment voltage as the second radio component 120b is adjusted. The controller 230a may simultaneously display via the display 240a the first alignment voltage as the first radio component 120a is adjusted and the second alignment voltage as the second radio component 120b is adjusted to enable the first user 115a to track an alignment of the first radio component 120a and the second radio component 120b via the display 240a. The controller 230a may determine when the first alignment voltage and the second alignment voltage are within an alignment threshold of each other. The first radio component 120a and the second radio component 120b are aligned to enable wireless communication when the first alignment voltage and the second alignment voltage are within the alignment threshold of each other.

The second point to point radio alignment system 140b includes the controller 230b that that is positioned at the second antenna 110b. The controller 230b may simultaneously monitor the first alignment voltage as the alignment of the first radio component 120a is adjusted and the second alignment voltage as the second radio component 120b is adjusted. The controller 230a may simultaneously display via the display 240b the first alignment voltage as the first radio component 120a is adjusted and the second alignment voltage as the second radio component 120b is adjusted to enable the second user 125a to track an alignment of the first radio component 120a and the second radio component 120b via the display 240b. The controller 240b may determine when the first alignment voltage and the second alignment voltage are within an alignment threshold of each other. The first radio component 120a and the second radio component 120b are aligned to enable wireless communication when the first alignment voltage and the second alignment voltage are within the alignment threshold of each other.

Figure 3:
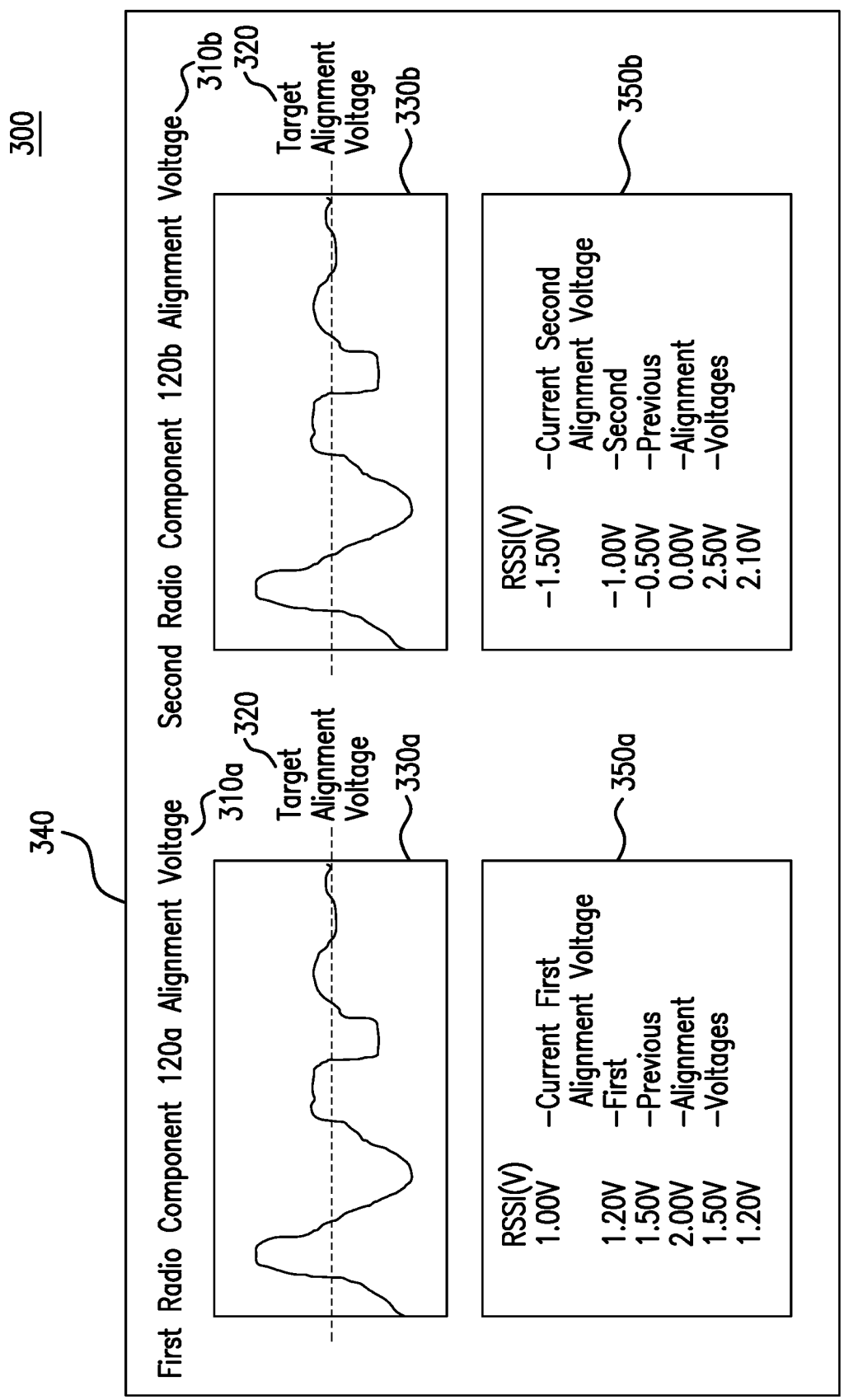
FIG. 3 depicts a block diagram of an example point to point radio alignment display.

Rather than requiring the first user 115a to radio to the second user 125a the instantaneous first alignment voltage as measured by the conventional voltmeter positioned at the first radio component 120a and vice versa for the second user 125a, the point to point alignment sever 160 may provide both the first alignment voltage and the second alignment voltage in real-time as well as the previous first alignment voltages and the second alignment voltages to the first point to point radio alignment system 140a and the second point to point radio alignment system 140b simultaneously. FIG. 3 depicts a block diagram of an example point to point radio alignment display 300. The example point to point radio alignment display 300 represents the first display 240a of the first point to point radio alignment system 140a that is displayed to the first user 115a and the second display 240b of the second point to point radio alignment system 140b that is displayed to the second user 125a.

The example point to point radio alignment display 300 depicts the listing of the real-time first alignment voltage as well as the previous first alignment voltages as depicted in the first alignment voltage listing 350a for the first radio component 120a as well as a historical alignment voltage graph 330a of the first alignment voltage as depicted in the first radio component 120a alignment voltage display 310a. The example point to point radio alignment display 300 also depicts the real-time the first alignment voltage for the first radio component 120b as well as the previous second alignment voltages as depicted in the second alignment voltage listing 350b for the second radio component 120b as well as a historical alignment voltage graph 330b of the second alignment voltage as depicted in the second radio component 120b alignment voltage display 310b. The example point to point radio alignment display 300 shares many similar features with the point to point radio alignment configuration 100 and the point to point radio alignment configuration 200; therefore only the differences between the example point to point radio alignment display 300 and the point to point radio alignment configuration 100 and the point to point radio alignment configuration 200 are to be discussed in further details.

As shown in FIG. 3, the current first alignment voltage may be depicted to the first user 115a and the second user 125a as shown in the first alignment voltage listing 350a. As the first user 115a adjusts the alignment bolt on the first radio component 120a, the voltmeter 210a may measure the first alignment voltage and the transceiver 220a may transmit in real-time the first alignment voltage to the point to point alignment sever 160 and the display 340 may display to the first user 115a the current first alignment voltage. In the example point to point alignment display 300, the display 340 depicts to the first user 115a that the current first alignment voltage is 1.00V based on the RSSI. The point to point alignment sever 160 may then provide to the transceiver 220b the current first alignment voltage of the first radio component 120a as the first user 115a adjusts the first radio component 120a and the display 340 may display to the second user 125a the current first alignment voltage of 1.00V in RSSI.

As the second user 125a adjusts the alignment bolt on the second radio component 120b, the voltmeter 210b may measure the second alignment voltage and the transceiver 220b may transmit in real-time the second alignment voltage to the point to point alignment server 160 and the display 340 may display to the second user 125a the current second alignment voltage. In the example point to point alignment display 300, the display depicts to the second user 125a that the current second alignment voltage is −1.50V based on the RSSI. The point to point alignment sever 160 may then provide to the transceiver 220a the current second alignment voltage of the second radio component 120b as the second user 125a adjusts the second radio component 120b and the display 340 may display to the first user 115a the current second alignment voltage of −1.50V in RSSI. In doing so, both the first user 115a and the second user 125a may have the first alignment voltage and the second alignment voltage simultaneously displayed to the first user 115a and the second user 125a in real-time such that the first user 115a and the second user 125a may further adjust the first radio component 120a and the second radio component 120b, respectively, based on the real-time simultaneous display of the first alignment voltage and the second alignment voltage.

In an embodiment, the first point to point radio alignment system 140a may provide the display 240a that displays the example point to point alignment display in FIG. 3 to the first user 115a in a web browser configuration. The second point to point radio alignment system 140b may provide the display 240b that displays the example point to point alignment display in FIG. 3 to the second user 125a in a web browser configuration. The first transceiver 220a may transmit the first alignment voltage in real-time to the point to point alignment server and receive the second alignment voltage in real-time via real-time two-communication in a web-socket configuration via LTE wireless communication. The second transceiver 220b may transmit the second alignment voltage in real-time to the point to point alignment server and receive the first alignment voltage in real-time via real-time communication in a web-socket configuration via LTE wireless communication. In doing so, the first user 115a and the second user 125a are no longer required to radio to each other the instantaneous alignment voltages displayed by the corresponding conventional voltmeters.

However, the first and second point to point radio alignment systems 140a, 140b may display to the first user 115a and the second user 125b via any type of display configuration such that the first user 115a and the second user 125a may observe the alignment voltages in real-time that will be apparent to those skilled in the relevant art(s) without departing from the spirit and scope of the disclosure. Further, the first and second point to point radio alignment systems 140a, 140b may wirelessly communicate the alignment voltages in real-time to the point to point alignment server 160 in any wireless communication protocol such that the first user 115a and the second user 125a may observe the alignment voltages in real-time that will be apparent to those skilled in the relevant art(s) without departing from the spirit and scope of the disclosure. Further the first and second point to point radio alignment systems 140a, 140b may wirelessly communicate the alignment voltages in real-time to the point to point alignment server 160 via any wireless communication such that the first user 115a and the second user 125a may observe the alignment voltages in real-time that will be apparent to those skilled in the relevant art(s) without departing from the spirit and scope of the disclosure.

The controller 230a of the first point to point radio alignment system 140a may simultaneously identify as the first alignment voltage is adjusted from a first previous alignment voltage and as the second alignment voltage is adjusted from a second previous alignment voltage. The first alignment voltage is adjusted from the first previous alignment voltage when the first radio component 120a is adjusted and the second alignment voltage is adjusted from the second previous alignment voltage when the second radio component 120b is adjusted. The controller 230a of the first point to point radio alignment system 140a may then simultaneously display via the display 340 a first history of first alignment voltages 350a as the first radio component 120a is adjusted and a second history of second alignment voltages 350b as the second radio component 120b is adjusted to enable the first user 115a to track a history 350(a-b) of the alignment of the first radio component 120a and the second radio component 120b. The first history of first alignment voltages 350a and the second history of second alignment voltages 350b provide feedback to the first user 115a as to the alignment of the first radio component 120a and the second radio component 120b based on each adjustment. The controller 230b of the second point to point alignment system 140b may operate in a similar manner.

As shown in FIG. 3, the first history of first alignment voltages may be depicted to the first user 115a and the second user 125a as shown in the first alignment voltage listing 350a. As the first user 115a adjusts the alignment bolt on the first radio component 120a, the voltmeter 210a may measure the first alignment voltage and the transceiver 220a may transmit in real-time the first alignment voltage to the point to point alignment server 160. The point to point alignment server 160 may then store each measured first alignment voltage as first previous alignment voltages in the point to point alignment database 250. The point to point alignment server 160 may then provide to the transceiver 220b the stored first history of first alignment voltages of the first radio component 120a as the first user 115a adjusts the first radio component 120a thereby transitioning the previous first alignment voltages generated from previous adjustments as first previous alignment voltages. The display 340 may then display to the second user 125a the first history of first alignment voltages in the first alignment voltage listing 350a as well as the second history of second alignment voltages in the second alignment voltage listing 350b.

As the second user 125a adjusts the alignment bolt on the second radio component 120b, the voltmeter 210b may measure the second alignment voltage and the transceiver 220b may transmit in real-time the second alignment voltage to the point to point alignment server 160. The point to point alignment server 160 may then store each measured second alignment voltage as the second history of second alignment voltages in the point to point alignment database 250. The point to point alignment server 160 may then provide to the transceiver 220a the stored second history of second alignment voltages of the second radio component 120b as the second user 125a adjusts the second radio component 120b thereby transitioning the previous second alignment voltages generated from previous adjustments as second previous alignment voltages. The display 340 may then display to the second user 125a the second history of second alignment voltages in the second alignment voltage listing 350b as well as the first history of first alignment voltages in the first alignment voltage listing 350a.

For example, the display 340 may display simultaneously to the first user 115a via the first point to point alignment system 140a and to the second user 125a via the second point to point alignment system 140b the first history of first alignment voltages as depicted in the first alignment voltage listing 350a and the second history of second alignment voltages as depicted in the second alignment voltage listing 350b. In such an example, the first user 115a adjusted the first alignment voltage based on the RSSI from 1.20V to 1.50V to 2.00V to 1.50V to 1.20V with a current first alignment voltage of 1.00V. The second user 125a adjusted the second alignment voltage based on the RSSI from 2.10V to 2.50V to 0.00V to −0.50V to −1.00V with a current second alignment voltage of −1.50V.

In such an example, the first user 115a and the second user 125a may have documented correlation as to the impact of each adjustment of the aligning bolt for the first radio component 120a by the first user 115a and the impact of each adjustment of the aligning bolt for the second radio component 120b. Rather than simply blindly adjusting the aligning bolts without any correlation as to the impact that the adjustment of the aligning bolts have on the alignment of the first radio component 120a with the second radio component 120b, the first user 115a and the second user 125a may simultaneously view the first history of the first alignment voltages and the second history of the second alignment voltages via the display 340 to determine the correlation of the impact of each adjustment of the aligning bolts on the alignment of the first radio component 120a and the second radio component 120b.

In such an example, the first user 115a and the second user 125a may identify that the alignment of the first radio component 120a and the second radio component 120b is worsening. The first history of the first alignment voltages is bouncing between 1.20V and 1.00V due to the adjustment of the alignment bolt of the first radio component 120a by the first user 115a and the second history of the second alignment voltages is moving from 2.10V to −1.50V. Thus, the alignment of the first radio component 120a and the second radio component 120b is worsening and the first user 115a and the second user 125a may then correlate future adjustments of the alignment bolts accordingly to improve the alignment of the first radio component 120a and the second radio component 120b. As discussed above, in an embodiment, the first point to point radio alignment system 140a and the second point to point radio alignment system 140b may determine the first alignment voltages and the second alignment voltages based on the signal strength in RSSI of the transmission signal 150 between the first radio component 120a and the second radio component 120b. However, any type of voltage and/or signal strength measurement that may provide an indication as to the alignment of the first radio component 120a and the second radio component 120b may be incorporated that will be apparent to those skilled in the relevant art(s) without departing from the spirit and scope of the disclosure.

The controller 230a of the first point to point alignment system 140a may simultaneously display a first graph 330a of the first history of first alignment voltages as the first radio component 120a is adjusted and a second graph 330b of the second history of second alignment voltages as the second radio component 120b is adjusted to enable the first user 115a to track the history of the alignment of the first radio component 120a and the second radio component 120b via the first graph 330a and the second graph 330b. The controller 230b of the second point to point alignment system 140b may operate in a similar manner.

For example, the display 340 may simultaneously display to the first user 115a and the second user 125a the first graph 330a that depicts the visual graph of the first history of first alignment voltages based on the adjustment of the first radio component 120a by the first user 115a. In such an example, the first graph 330a may depict the target alignment voltage 320 which is the target alignment voltage 320 determined by the RF engineer when the first alignment voltage and the second alignment voltage are within the alignment threshold of the target alignment voltage 320 that the first radio component 120a and the second radio component 120b are adequately aligned to establish wireless communication.

The first graph 330a may also depict the visual graph of the first history of the first alignment voltages relative to the target alignment voltage 320. In doing so, the first user 115a and the second user 125a may simultaneously observe a visual graph of the first history of alignment voltages relative the target alignment voltage 320. The first user 115a may continue to adjust the first alignment voltage of the first radio component 120a and receive visual feedback as to the first alignment voltage relative to the target alignment voltage 320. For example, the first user 115a may easily identify the highest first alignment voltage as well as the lowest alignment voltage from as the first user 115a adjusts the adjustment bolt of the first radio component 120a. The first user 115a may then continue to observe in real-time the first alignment voltage relative to each adjustment of the alignment bolt relative to the target alignment voltage 320 such that the first user 115a may continue to refine in real-time the adjustment of the alignment bolt such that the first graph 330a depicts the progression of the first alignment voltage towards the target alignment voltage 320. The second graph 330b may operate in a similar manner.

The controller 230a of the first point to point radio alignment system 140a may simultaneously identify for each time interval the corresponding first alignment voltage based on the alignment of the first radio component 120a during the corresponding time interval and the corresponding second alignment voltage based on the alignment of the second radio component during the corresponding time interval. The controller 230a may simultaneously display the first history of first alignment voltages and the second history of second alignment voltages for each corresponding time interval to enable the first user 115a to track the history of the alignment of the first radio component 120a and the second radio component 120b for each corresponding time interval. The first history of alignment voltages and the second history of alignment voltages provide feedback to the first user 115a as to the alignment of the first radio component 120a and the second radio component 120b based on each corresponding time interval. For example, each of the first previous alignment voltages depicted in the first alignment voltage listing 350a and the second previous alignment voltages depicted in the second alignment voltage listing 350b and displayed by the display 340 may be captured and displayed in a time interval of every second. The first previous alignment voltages and the second alignment voltages may be captured and displayed in any time interval that may enable first user 115a and the second user 125a to align the first radio component 120a and the second radio component 120b that will be apparent to those skilled in the relevant art(s) without departing from the spirit and scope of the disclosure.

In addition to the first user 115a and the second user 125a who may observe the first history of first alignment voltages and the second history of second alignment voltages to assist in the alignment of the first radio component 120a and the second radio component 120b, an overall administrator may also observe the first history of alignment voltages and the second history of alignment voltages as provided by the display 340 to audit whether the first user 115a and the second user 125a indeed adjusted the first alignment voltage and the second alignment voltage to be within the alignment threshold of the target alignment voltage 320. The overall administrator may be a supervisor of the alignment of the first radio component 120a and the second radio component 120b. Rather than simply relying on the first user 115a and the second user 125a in assuring the overall administrator that the first alignment voltage and the second alignment voltage are within the alignment threshold of the target alignment voltage 320, the overall administrator may actually verify based on the first history of alignment voltages and the second history of alignment voltages as displayed by the display 340 as to whether the first alignment voltage and the second alignment voltage are indeed within the alignment threshold of the target alignment voltage 320.

The controller 230a of the first point to point radio alignment system 140a may identify a model of the first radio component 120a and correlate a RSSI value for the model of the first radio component 120a relative to the first alignment voltage measured by the voltmeter 210a of the first point to point radio alignment system 140a. The controller 230a may convert the first alignment voltage measured by the voltmeter 210a to a corresponding RSSI value based on the correlation of the RSSI value for the model of the first radio component 120a to the first alignment voltage. The controller 230a may simultaneously display a first RSSI value as the first radio component 120a is adjusted and a second RSSI value as the second radio component 120b is adjusted to enable the first user 115a to track the alignment of the first radio component 120a and the second radio component 120b. The controller 230b of the second point to point radio alignment system 140b may operate in a similar manner.

The controller 230a of the first point to point radio alignment system 140a may automatically adapt to the model of the first radio component 120a with regard to converting the voltage measured by the voltmeter 210a that is installed into the port of the radio component 120a to a corresponding RSSI voltage value. Each manufacturer of each model of the first radio component 120a may have a different conversion with regard to converting the voltage that that is measured by the voltmeter 210a as provided by the port of the radio component 120a to the corresponding RSSI voltage value. For example, a first manufacturer of a first radio component may have a RSSI to voltage translation that maximizes at 5V while a second manufacturer of a second radio component may have a RSSI to voltage translation that maximizes at 4V. The controller 230a of the first point to point radio alignment system 140a may identify the model of the first radio component 120a and then automatically determine the RSSI to voltage translation associated with the model of the first radio component 120. Rather than requiring the first user 115a to manually execute the conversion of the voltage measured by the voltmeter 210 based on the model of the first radio component 120a, the controller 230a may automatically execute the RSSI to voltage translation associated with the model of the first radio component 120 thereby triggering the display 340 to display the appropriate RSSI voltage value relative to the model of the first radio component 120a. The controller 230b of the second point to point radio alignment system 140b may operate in a similar manner.

In an embodiment, a heading/tilt sensor may be positioned on the first antenna 110a to measure a first heading RSSI value and a first tilt RSSI value that is generated from an alignment of the first radio component 120a positioned on the first antenna 110a. The first heading RSSI value is adjusted when a heading alignment of the first radio component 120a is adjusted and the first tilt RSSI value is adjusted when a tilt alignment of the first radio component 120a is adjusted. A heading/tilt sensor may be positioned on the second antenna 110b to measure a second heading RSSI value and a first tilt RSSI value that is generated from an alignment of the second radio component 120b positioned on the second antenna 110b. The second RSSI value is adjusted when a heading alignment of the second radio component 120b is adjusted and the second tilt RSSI value is adjusted when a tilt alignment of the second radio component 120b is adjusted.

In addition to the first alignment voltage and the second alignment voltage being measured by the voltmeter 210a and the voltmeter 210b, heading/tilt sensors may be positioned on the first antenna 110a and the second antenna 110b to provide additional feedback to the first user 115a and the second user 125a with regard to aligning the first radio component 120a and the second radio component 120b. The transceiver 220a of the first point to point radio alignment system 140a may receive a second heading RSSI value and a second tilt RSSI value that is measured at the second antenna 110b and generated from the alignment of the second radio component 120b positioned on the second antenna 110b. The transceiver 220b of the second point to point radio alignment system 140b may receive the first heading RSSI value and the first tilt RSSI value that is measured at the first antenna 110a and generated from the alignment of the first radio component 120a positioned on the first antenna 110a.

The controller 230a of the first point to point radio alignment system 140a may simultaneously monitor the first heading RSSI value and the first tilt RSSI value as the first radio component is adjusted and the second heading RSSI value and the second tilt RSSI value as the second radio component is adjusted. The controller 230a may simultaneously display the first heading RSSI value and the first tilt RSSI value is adjusted and the second heading RSSI value and the second tilt RSSI value as the second radio component is adjusted to enable the first user 115a to track the alignment of the first radio component 120a and the second radio component 120b. The controller 230a may determine when the first heading RSSI value and the first tilt RSSI value are within an alignment threshold of the second heading RSSI value and the second tilt RSSI value. The first radio component 120a and the second radio component 120b are aligned to enable wireless communication when the first heading RSSI value and the first tilt RSSI value are within the alignment threshold of the second heading RSSI value and the second tilt RSSI value. The controller 230b of the second point to point radio alignment system 140b may operate in a similar manner.

Figure 4:
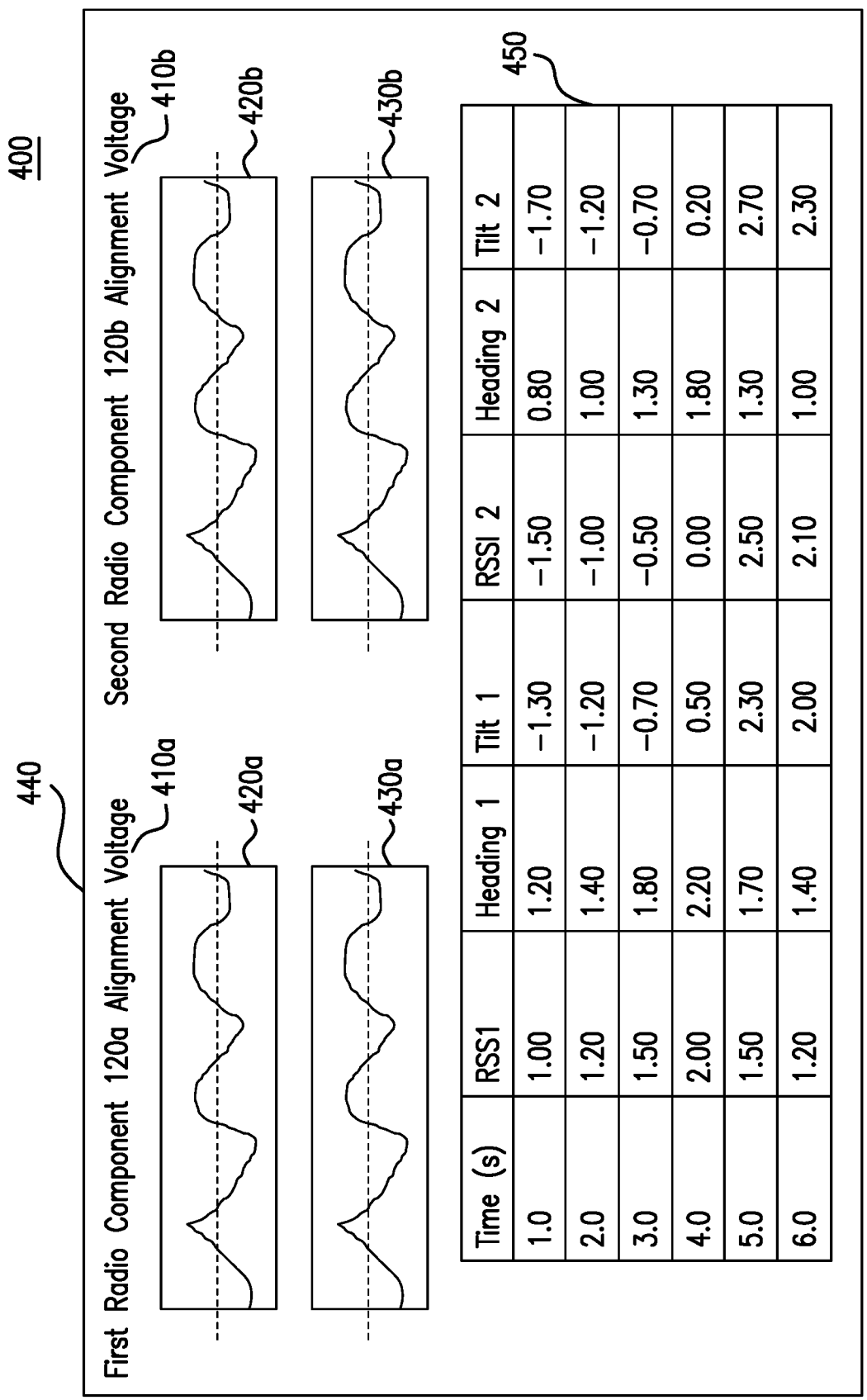
FIG. 4 depicts a block diagram of an example point to point radio alignment display.

FIG. 4 depicts a block diagram of an example point to point radio alignment display 400. The example point to point radio alignment display 400 represents the first display 240a of the first point to point radio alignment system 140a that is displayed to the first user 115a and the second display 240b of the second point to point radio alignment system 140b that is displayed to the second user 125a. The example point to point radio alignment display 400 depicts the listing of the real-time first heading RSSI value and the first heading tilt as well as the previous first alignment voltages and the previous first tilt RSSI values as depicted in the alignment voltage listing 350 for the first radio component 120a. This is in addition to the real-time alignment voltage as well as the previous first alignment voltages also as depicted in the alignment voltage listing 350. The example point to point alignment display 400 also depicts the listing of the real-time second heading RSSI value and the second heading tilt in the alignment voltage listing 350 for the second radio component 120b. This is in addition to the real-time second alignment voltage as well as the previous second alignment voltages also as depicted in the alignment voltage listing 350. The alignment voltage listing also depicts the time interval that each of the alignment voltage values were measured.

The example point to point radio alignment display 400 also depicts the historical heading alignment RSSI graph 420a and the historical tilt alignment RSSI graph 430a as provided in the first radio component 120a alignment voltage 410a. The example point to point radio alignment display 400 also depicts the historical alignment voltage graph 420b and the historical tilt alignment RSSI graph 430b as provided in the second radio component 120b alignment voltage 410b. The example point to point radio alignment display 400 shares many similar features with the point to point radio alignment configuration 100, the point to point radio alignment configuration 200, and the example point to point radio alignment display 300; therefore only the differences between the example point to point radio alignment display 400 and the example point to point radio alignment display 300, the point to point radio alignment configuration 100 and the point to point radio alignment configuration 200 are to be discussed in further details.

As discussed in detail above, the adjusting of the alignment bolts based on the alignment voltage of the first radio component 120a measured by the voltmeter 210a installed into the signal port of the first radio component 120a and the alignment voltage of the second radio component 120b measured by the voltmeter 210b installed into the signal port of the second radio component 120b may provide feedback to the first user 115a and the second user 125a as to the strength of the transmission signal 150 between the first radio component 120a and the second radio component 120b. In addition to the feedback of the alignment voltage of the first radio component 120a and the second radio component 120b, the controller 230a of the point to point radio alignment system 140a and the controller 230b of the point to point radio alignment system 140b may also provide the additional feedback as to the alignment of the tilt RSSI value and the heading RSSI value for the first radio component 120a and the second radio component 120b.

In doing so the first user 115a and the second user 125a may be able to further correlate the adjustment of the tilt alignment bolt as well as the heading alignment bolt relative to the impact to the different alignment voltages for the first radio component 120a and the second radio component 120b. For example, the first user 115a may adjust the tilt alignment bolt of the first radio component 120a and then observe simultaneously in real-time that such an adjustment impacted the first alignment voltage, the first tilt RSSI value, the first heading RSSI value, the second alignment voltage, the second tilt RSSI value, and the second heading RSSI value. Such simultaneous feedback in real-time may provide the first user with further correlation as to the impact of each adjustment of the tilt alignment bolt as well as the heading alignment bolt thereby resulting in a significant decrease in time required to adequately align the first radio component 120a and the second radio component 120b to establish wireless communication between the first radio component 120a and the second radio component 120b.

Further, the additional feedback of the tilt RSSI values and the heading RSSI values may enable the first user 115a and the second user 125a to compartmentalize the adjusting of the first radio component 120a and the second radio component 120b. For example, the first user 115a may adjust the tilt alignment bolt of the first radio component 120a and the second user 125a may adjust the tilt alignment bolt of the second radio component 120b. In doing so, the first user 115a and the second user 125a may continue to adjust the respective tilt alignment bolts until the first tilt RSSI value for the first radio component 120a and the second tilt RSSI value of the second radio component 120b are within the alignment threshold of the target tilt RSSI value.

Once the first user 115a has adjusted the first tilt RSSI value and the second user 125a has adjusted the second tilt RSSI voltages to be within the alignment threshold of target tilt RSSI value, the first user 115a and the second user 125a may then move onto adjusting the respective heading alignment bolts to adjust first heading RSSI value and the second RSSI value to respectively be within the alignment threshold of the target heading RSSI value. In doing so, the first user 115a and the first user 125a may compartmentalize the adjusting of the respective tilt alignment bolts and the heading alignment bolts to be within the respective alignment thresholds of the target tilt RSSI value and the target heading RSSI value to thereby further decrease the time required to adequately align the first radio component 120a with the second radio component 120b engage in wireless communication.

In an embodiment, a Real-Time Kinematic (RTK) sensor may be positioned on the first radio component 120a of the first antenna 110a to measure a centimeter positioning of the first radio component 120a of the first antenna 110a in three-dimensional (3D) space relative to a Global Positioning Satellite (GPS). The centimeter positioning of the first radio component 120a in 3D space may provide the height of the first radio component 120a as well as the latitude and the longitude position of the first radio component 120a. The centimeter positioning of the first radio component 120a in 3D space with regard to the height, latitude, and longitude of the first radio component 120a may be generated from an alignment of the first radio component 120a positioned on the first antenna 110a.

The centimeter positioning of the height, latitude, and longitude is adjusted when the first radio component 120a is adjusted. The RTK sensor may also be positioned on the second radio component 120b of the second antenna 110b to provide the centimeter positioning of the height, latitude, and longitude of the second radio component 120b. The centimeter positioning of the second radio component 120b in 3D space with regard to height, latitude, and longitude of the second radio component 120b may be generated from the alignment of the second radio component 120b positioned on the second antenna 110b. The centimeter positioning of the height, latitude, and longitude is adjusted when the second radio component 120b is adjusted.

Further, the heading and tilt senor as well as a YAW sensor may also be positioned on the first radio component 120a and the second radio component 120b as discussed in detail above. In such an embodiment, the centimeter positioning of the first radio component 120a and the second radio component 120b based on height, longitude, and latitude may provide real-time feedback to the first user 115a and the second user 125a with regard to the real-time positioning of the first radio component 120a and the second radio component 120b. In addition, the orientation of the first radio component 120a and the second radio component 120b based on heading, tilt, and YAW may provide real-time feedback to the first user 115a and the second user 125a with regard to the real-time orientation of the first radio component 120a and the second radio component 120b. In doing so, the first user 115a and the second user 125a may receive simultaneous feedback in real-time regarding the centimeter positioning of the first radio component 120a and the second radio component 120b as well as the orientation of the first radio component 120a and the second radio component 120b thereby significantly increasing the alignment of the first radio component 120a and the second radio component 120b to establish wireless communication.

CONCLUSION

It is to be appreciated that the Detailed Description section, and not the Abstract section, is intended to be used to interpret the claims. The Abstract section may set forth one or more, but not all exemplary embodiments, of the present disclosure, and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) the various changes in form and detail can be made without departing from the spirt and scope of the present disclosure. Thus the present disclosure should not be limited by any of the above-described exemplary embodiments, but should be defined only in accordance with the following claims and their equivalents.

What is claimed is:

1. A point to point radio alignment system that aligns a first radio component positioned on a first antenna and a second radio component positioned on a second antenna to enable wireless communication between the first radio component and the second radio component, comprising:
   a voltmeter positioned at the first antenna and configured to measure a first alignment voltage that is generated from an alignment of the first radio component positioned on the first antenna, wherein the first alignment voltage is adjusted when the alignment of the first radio component is adjusted;
   a transceiver positioned at the first antenna and configured to receive a second alignment voltage that is measured at the second antenna and generated from an alignment of the second radio component positioned on the second antenna, wherein the second alignment voltage is adjusted when the alignment of the second radio component is adjusted;
   a controller positioned at the first antenna and configured to:
      simultaneously monitor the first alignment voltage as the alignment of the first radio component is adjusted and the second alignment voltage as the second radio component is adjusted,
      simultaneously display the first alignment voltage as the first radio component is adjusted and the second alignment voltage as the second radio component is adjusted to enable a first user to track an alignment of the first radio component and the second radio component, and
      determine when the first alignment voltage and the second alignment voltage are within an alignment threshold of each other, wherein the first radio component and the second radio component are aligned to enable wireless communication when the first alignment voltage and the second alignment threshold are within the alignment threshold of each other.

2. The point to point radio alignment system of claim 1, wherein the controller is further configured to:
   simultaneously identify as the first alignment voltage is adjusted from a first previous alignment voltage and as the second alignment voltage is adjusted from a second previous alignment voltage, wherein the first alignment voltage is adjusted from the first previous alignment voltage when the first radio component is adjusted and the second alignment voltage is adjusted from the second previous alignment voltage when the second radio component is adjusted;
   simultaneously display a first history of first alignment voltages as the first radio component is adjusted and a second history of second alignment voltages as the second radio component is adjusted to enable the first user to track a history of the alignment of the first radio component and the second radio component, wherein the first history of first alignment voltages and the second history of second alignment voltages provides feedback to the first user as to the alignment of the first radio component and the second radio component based on each adjustment.

3. The point to point radio alignment system of claim 2, wherein the controller is further configured to simultaneously display a first graph of the first history of first alignment voltages as the first radio component is adjusted and a second graph of the second history of second alignment voltages as the second radio component is adjusted to enable the first user to track the history of the alignment of the first radio component and the second radio component via the first graph and the second graph.

4. The point to point radio alignment system of claim 2, wherein the controller is further configured to:
   simultaneously identify for each time interval the corresponding first alignment voltage based on the alignment of the first radio component during the corresponding time interval and the corresponding second alignment voltage based on the alignment of the second radio component during the corresponding time interval;
   simultaneously display the first history of first alignment voltages and the second history of second alignment voltages for each corresponding time interval to enable the first user to track the history of the alignment of the first radio component and the second radio component for each corresponding time interval, wherein the first history of alignment voltages and the second history of alignment voltages provides feedback to the first user as to the alignment of the first radio component and the second radio component based on each corresponding time interval.

5. The point to point radio alignment system of claim 1, wherein the transceiver is further configured to:
   transmit the first alignment voltage as measured at the first antenna as the first radio component positioned on the first antenna is adjusted in real-time to a point to point radio alignment server, wherein each first alignment voltage that is generated as the first radio component is adjusted in real-time is transmitted to the point to point radio alignment server; and
   receive the second alignment voltage as measured at the second antenna as the second radio component positioned on the second antenna is adjusted in real-time from the point to point radio alignment server, wherein each second alignment voltage that is generated as the second radio component is adjusted in real-time is received from the point to point radio alignment server.

6. The point to point radio alignment system of claim 5, wherein the transceiver is further configured to:
   transmit the first alignment voltage as measured at the first antenna as the first radio component is adjusted in real-time to the point to point radio alignment server via a websocket communication channel to enable real-time wireless communication between the point to point radio alignment server and a web browser generated by the controller; and
   receive the second alignment voltage as measured at the second antenna as the second radio component is adjusted in real-time from the point to point radio alignment server via the websocket communication channel to enable the real-time wireless communication between the point radio alignment server and the web browser generated by the controller.

7. The point to point radio alignment system of claim 1, wherein the controller is further configured to:
   identify a model of the first radio component and correlate a Received Signal Strength Indication (RSSI) value for the model of the first radio component relative to the first alignment voltage measured by the voltmeter;
   convert the first alignment voltage measured by the voltmeter to a corresponding RSSI value based on the correlation of the RSSI value for the model of the first radio component to the first alignment voltage; and
   simultaneously display a first RSSI value as the first radio component is adjusted and a second RSSI value as the second radio component is adjusted to enable the first user to track the alignment of the first radio component and the second radio component.

8. The point to point radio alignment system of claim 7, further comprising:
   a heading/tilt sensor positioned at the first antenna and configured to measure a first heading RSSI value and a first tilt RSSI value that is generated from the alignment of the first radio component positioned on the first antenna, wherein the first heading RSSI value is adjusted when a heading alignment of the first radio component is adjusted and the second tilt RSSI value is adjusted when a tilt alignment of the first radio component is adjusted.

9. The point to point radio alignment system of claim 8, wherein the transceiver is further configured to receive a second heading RSSI value and a second tilt RSSI value that is measured at the second antenna and generated from the alignment of the second radio component positioned on the second antenna, wherein the second heading RSSI value is adjusted when a heading alignment of the second radio component is adjusted and the second tilt RSSI value is adjusted when a tilt alignment of the second radio component is adjusted.

10. The point to point radio alignment system of claim 9, wherein the controller is further configured to:
    simultaneously monitor the first heading RSSI value and the first tilt RSSI value as the first radio component is adjusted and the second heading RSSI value and the second tilt RSSI value as the second radio component is adjusted;
    simultaneously display the first heading RSSI value and first tilt RSSI value is adjusted and the second heading RSSI value and the second tilt RSSI value as the second radio component is adjusted to enable the first user to track the alignment of the first radio component and the second radio component; and
    determine when the first heading RSSI value and the first tilt RSSI value are within an alignment threshold of the second heading RSSI value and the second tilt RSSI value, wherein the first radio component and the second radio component are aligned to enable wireless communication when the first heading RSSI value and the first tilt RSSI value are within the alignment threshold of the second heading RSSI value and the second tilt RSSI value.

11. A method for point to point radio alignment that aligns a first radio component positioned on a first antenna and a second radio component positioned on a second antenna to enable wireless communication between the first radio component and the second radio component, comprising:
    measuring, by a voltmeter positioned at the first antenna, a first alignment voltage that is generated from an alignment of the first radio component positioned on the first antenna, wherein the first alignment voltage is adjusted when the alignment of the first radio component is adjusted;
    receiving, by a transceiver positioned at the first antenna, a second alignment voltage that is measured at the second antenna and generated from an alignment of the second radio component positioned on the second antenna, wherein the second alignment voltage is adjusted when the alignment of the second radio component is adjusted;

simultaneously monitoring, by a controller, the first alignment voltage as the alignment of the first radio component is adjusted and the second alignment voltage as the second radio component is adjusted;

simultaneously displaying the first alignment voltage as the first radio component is adjusted and the second alignment voltage as the second radio component is adjusted to enable a first user to track an alignment of the first radio component and the second radio component; and determining when the first alignment voltage and the second alignment voltage are within an alignment threshold of each other, wherein the first radio component and the second radio component are aligned to enable wireless communication when the first alignment voltage and the second alignment voltage are within the alignment threshold of each other.

12. The method of claim 11, further comprising:
simultaneously identifying as the first alignment voltage is adjusted from a first previous alignment voltage and as the second alignment voltage is adjusted from a second previous alignment voltage, wherein the first alignment voltage is adjusted from the first previous alignment voltage when the first radio component is adjusted and the second alignment voltage is adjusted from the second previous alignment voltage when the second radio component is adjusted; and simultaneously displaying a first history of first alignment voltages as the first radio component is adjusted and a second history of second alignment voltages as the second radio component is adjusted to enable the first user to track a history of the alignment of the first radio component and the second radio component, wherein the first history of first alignment voltages and the second history of second alignment voltages provides feedback to the first user as to the alignment of the first radio component and the second radio component based on each adjustment.

13. The method of claim 12, further comprising:
simultaneously displaying a first graph of the first history of first alignment voltages as the first radio component is adjusted and a second graph of the second history of second alignment voltages as the second radio component is adjusted to enable the first user to track the history of the alignment of the first radio component and the second radio component via the first graph and the second graph.

14. The method of claim 12, further comprising:
simultaneously identifying for each time interval the corresponding first alignment voltage based on the alignment of the first radio component during the corresponding time interval and the corresponding second alignment voltage based on the alignment of the second radio component during the corresponding time interval;

simultaneously displaying the first history of the first alignment voltages and the second history of second alignment voltages for each corresponding time interval to enable the first user to track the history of the alignment of the first radio component and the second radio component for each corresponding time interval, wherein the first history of first alignment voltages and the second history of second alignment voltages provides feedback to the first user as to the alignment of the first radio component and the second radio component based on each corresponding time interval.

15. The method of claim 14, further comprising:
transmitting the first alignment voltage as measured at the first antenna as the first radio component positioned on the first antenna is adjusted in real-time to a point to point radio alignment server, wherein each first alignment voltage that is generated as the first radio component is adjusted in real-time is transmitted to the point to point radio alignment server; and receiving the second alignment voltage as measured at the second antenna as the second radio component positioned on the second antenna is adjusted in real-time from the point to point radio alignment server, wherein each second alignment voltage that is generated as the second radio component is adjusted in real-time is received from the point to point radio alignment server.

16. The method of claim 15, further comprising:
transmitting the first alignment voltage as measured at the first antenna as the first radio component is adjusted in real-time to the point to point radio alignment server via a websocket communication channel to enable real-time wireless communication between the point to point radio alignment server and a web browser generated by the controller; and receiving the second alignment voltage as measured at the second antenna as the second radio component is adjusted in real-time from the point to point radio alignment server via the websocket communication channel to enable the real-time wireless communication between the point to point radio alignment server and the web browser generated by the controller.

17. The method of claim 11, further comprising:
identifying a model of the first radio component and correlate a Received Signal Strength Indication (RSSI) value for the model of the first radio component relative to the first alignment voltage measured by the voltmeter;

converting the first alignment voltage measured by the voltmeter to a corresponding RSSI value based on the correlation of the RSSI value for the model of the first radio component to the first alignment voltage; and simultaneously displaying a first RSSI value as the first radio component is adjusted and a second RSSI value as the second radio component is adjusted to enable the first user to track the alignment of the first radio component and the second radio component.

18. The method of claim 17, further comprising:
measuring a first heading RSSI value and a first tilt RSSI value that is generated from the alignment of the first radio component positioned on the first antenna, wherein the first heading RSSI value is adjusted when a heading alignment of the first radio component is adjusted and the second tilt RSSI value is adjusted when a tilt alignment of the first radio component is adjusted.

19. The method of claim 18, further comprising:
receiving a second heading RSSI value and a second tilt RSSI value that is measured at the second antenna and generated from the alignment of the second radio component positioned on the second antenna, wherein the second heading RSSI value is adjusted when a heading alignment of the second radio component is adjusted and the second tilt RSSI value is adjusted when a tilt alignment of the second radio component is adjusted.

20. The method of claim 19, further comprising:
simultaneously monitoring the first heading RSSI value and the first tilt RSSI value as the first radio component is adjusted and the second heading RSSI value and the second RSSI tilt value as the second radio component is adjusted;
simultaneously displaying the first heading RSSI value and the first tilt RSSI value as the first radio component is adjusted and the second heading RSSI value and the second tilt RSSI value as the second radio component is adjusted to enable the first user to track the alignment of the first radio component and the second radio component; and
determining when the first heading RSSI value and the first tilt RSSI value are within an alignment threshold of the second heading RSSI value and the second tilt RSSI value, wherein the first radio component and the second radio component are aligned to enable wireless communication when the first heading RSSI value and the first tilt RSSI value are within the alignment threshold of the second heading RSSI value and the second tilt RSSI value.

* * * * *